(No Model.)
B. E. OLSEN & C. GABRIEL.
MOLD FOR FORMING DRAIN PIPES.
No. 404,219. Patented May 28, 1889.
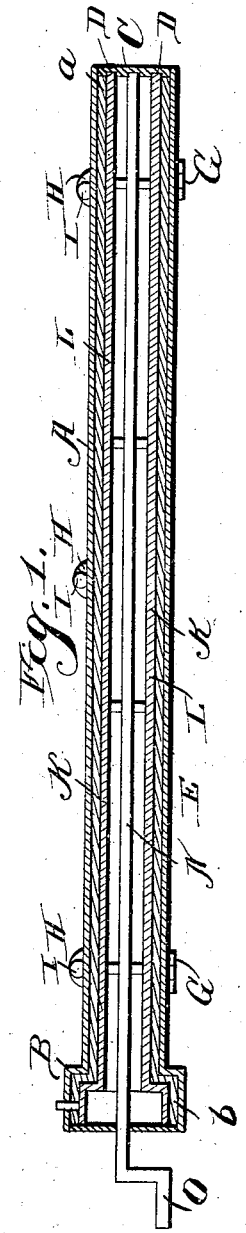
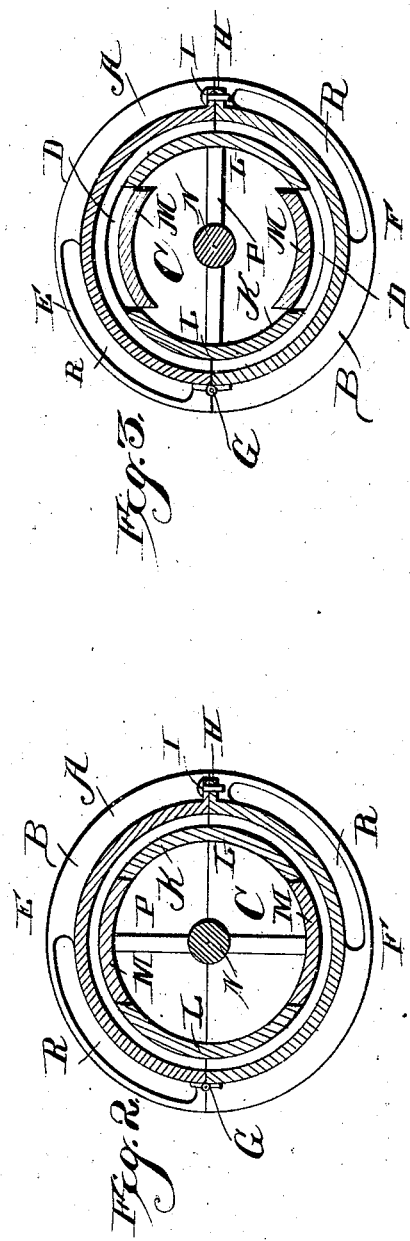
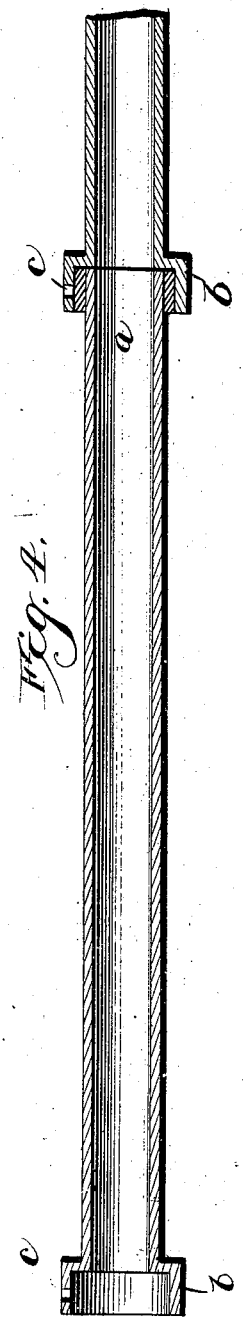
Witnesses
Henry J. Dietrich
J. W. Garner
Inventors
Bertel E. Olsen and
Charles Gabriel,
By their Attorneys

UNITED STATES PATENT OFFICE.

BERTEL EMIL OLSEN AND CHARLES GABRIEL, OF VICTORIA, BRITISH COLUMBIA, CANADA.

MOLD FOR FORMING DRAIN-PIPES.

SPECIFICATION forming part of Letters Patent No. 404,219, dated May 28, 1889.

Application filed January 3, 1889. Serial No. 295,298. (No model.)

*To all whom it may concern:*

Be it known that we, BERTEL EMIL OLSEN and CHARLES GABRIEL, citizens of the United States, residing at Victoria, British Columbia, Canada, have invented a new and useful Improvement in Molds for Forming Drain-Pipes, of which the following is a specification.

Our invention relates to an improvement in molds for forming drain-pipes; and it consists in the peculiar construction and combination of devices that will be more fully set forth hereinafter, and particularly pointed out in the claims.

The object of our invention is to provide a mold which is adapted to form a drain-pipe from composition or plastic material and to liberate the pipe without injury thereto after the composition has "set" or hardened.

In the accompanying drawings, Figure 1 is a longitudinal sectional view of a mold embodying our improvement. Fig. 2 is a vertical transverse sectional view of the same. Fig. 3 is a similar view showing the inner core arranged in a different position. Fig. 4 is a longitudinal sectional view of a pair of our improved drain-pipes, showing the mode of coupling them together when laying the same.

The outer shell or mold, A, is cylindrical in shape, of suitable length and diameter, and has an enlargement, B, formed at one end, to provide the corresponding enlarged end of the drain-pipe. Both ends of the mold are closed, and the smaller end, C, thereof is provided on its inner side with an annular groove, D, which is arranged concentrically with the sides of the mold. The latter is formed of two longitudinal sections, E F, each of which is semi-cylindrical in shape, the said sections being secured together at one side by hinged members G, and having ears H formed on their opposite sides adapted to meet when the sections are closed together and to receive bolts I, whereby the said sections may be firmly secured when closed.

The inner shell or core, K, is of less diameter than the outer shell or mold and corresponds with the latter in shape and is adapted to fit concentrically therein, with its smaller end engaging the annular groove D, whereby the core or inner shell will be retained in the correct relative position within the mold. The said core comprises a pair of segments, L, and an intermediate pair of smaller segments, M, adapted to fit between the opposing edges of the segments L. A shaft, N, extends longitudinally through the center of the mold, is journaled in a central opening in the enlarged end thereof, and has its inner end stepped in a central recess in the smaller end of the mold. At the outer end of the said shaft is a crank, O, which adapts it to be rotated, and projecting from opposite sides of the said shaft at suitable intervals throughout its length are arms P, which are adapted, when the shaft is turned to the position shown in Fig. 2, to arrange the segments M in the same radius with the segments L, and when the shaft N is turned to the position illustrated in Fig. 3 said arm, by moving past the segments M, will release the latter and permit them to be readily removed from the mold.

The operation of our invention is as follows: The composition while in a plastic condition is forced into the mold when the latter is arranged in a position shown in Fig. 2, and caused to fill the annular space between the outer shell and the inner shell or core, the enlarged portion B of the mold being provided with openings R, through which the composition is introduced. When the composition has set or hardened sufficiently, the sections of the outer shell or mold are opened on their hinges and the shaft N is turned to the position illustrated in Fig. 3, so as to release the segments M and permit the latter to be first removed from the interior of the pipe, after which the larger segments, L, may be readily removed therefrom without injuring the pipe, thus enabling a pipe formed of composition to be produced that will not crack and fly to pieces while in the process of cooling and hardening. The smaller end of each pipe *a* is introduced into the larger end, *b*, of the adjacent pipe when laying the same, and a suitable quantity of the same composition of which the pipes are formed is introduced into the annular space between said engaging smaller and larger ends of the said pipes through an opening, *c*, formed in the latter. When the composition "sets," it unites the pipes so firmly as to render all the sections of the pipe practically integral, as it is impossible to break the joint between the said sections without destroying them.

Having thus described our invention, we claim—

1. In a pipe-mold, the combination of an outer shell composed of sections hinged together and having closed ends with a core composed of separable segmental sections, and a central revoluble shaft having radial arms adapted to bear against the inner sides of the core-sections, substantially as set forth.

2. In a pipe-mold, the combination, with an outer shell having a closed end provided with an interior annular groove, of a core composed of separable segmental sections having one end fitted in said groove, and a central revoluble shaft having radial arms adapted to bear against the inner sides of the core-sections, substantially as set forth.

3. In a pipe-mold, the core composed of separable segmental sections, in combination with the outer shell, and the central shaft journaled in the ends of the latter and having radiating arms adapted to bear against the inner sides of the core-sections, substantially as set forth.

In testimony that we claim the foregoing as our own we have hereto affixed our signatures in presence of two witnesses.

BERTEL EMIL OLSEN.
CHARLES GABRIEL.

Witnesses:
W. CHANTRELL MARTIN,
R. WALBEY.